United States Patent [19]

Ito

[11] Patent Number: 5,176,223
[45] Date of Patent: Jan. 5, 1993

[54] SPRING DRIVE
[75] Inventor: Shunichi Ito, Tokyo, Japan
[73] Assignee: GearTech Co., Ltd., Tokyo, Japan
[21] Appl. No.: 761,546
[22] Filed: Sep. 18, 1991
[30] Foreign Application Priority Data Sep. 5, 1991 [JP] Japan .............................. 3-79411[U]
Sep. 5, 1991 [JP] Japan .............................. 3-79412[U]

[51] Int. Cl.⁵ ................................................ F03G 1/08
[52] U.S. Cl. .............................. 185/39; 185/DIG. 1; 446/464
[58] Field of Search .......................... 185/39, DIG. 1; 446/464

[56] References Cited
U.S. PATENT DOCUMENTS 4,241,534 12/1980 Larsson et al. .................... 185/39 X
4,463,831 8/1984 Wakase ................................. 185/39
4,623,039 11/1986 Itoh ........................... 185/DIG. 1 X
4,662,477 5/1987 Minoru ............................. 185/39 X Primary Examiner—Allan D. Herrmann
Attorney, Agent, or Firm—Sughrue, Mion, Zinn, Macpeak & Seas

[57] ABSTRACT

The present invention is concerns with a spring drive used as a driving power source for a moving toy. The spring drive has a windup pinion of which at least the top of one end is formed at its rotation axis as a small diameter end having a diameter smaller than the diameter of the body thereof, and a supporting member having a supporting surface for supporting the windup pinion at the small diameter end. The windup pinion is freely rotatively supported at its small diameter end on the supporting surface of the supporting member, the friction force acting against the rotation of the pinion, is decreased.

6 Claims, 3 Drawing Sheets

SPRING DRIVE

BACKGROUND OF THE INVENTION

1. Field of the Invention

The present invention relates to spring drive, more particularly to a spring drive for use in a moving toy or the like.

2. Description of the Prior Art

A spring drives have been widely used as driving power sources, moving toys by the unwinding action of a spring which has been wound frictionally by rubbing the drive wheel against the floor.

There has been used a spring drive as shown in FIG. 6 comprising a pinion 2 provided around a wheel shaft 1, a spur gear 3 meshed with the pinion 2, a windup pinion 5a always meshed with the spur gear 3 and movably supported by a slit-shaped hole bearing 4a, a spring windup shaft 7a having a gear 6a meshed with the pinion 5a, a large 8a provided around the spring windup shaft 7a, a drive pinion 9a always meshed with the large gear 8a and movably supported by a slit-shaped hole bearing 22a, right and left side frames 11a and 12a supporting the gear trains, and a partition frame 13 interposed therebetween.

The conventional spring drive thus constructed has the partition frame 13 for supporting one end of the windup pinion 5a and one end of the drive pinion 9a. It is obviously desirable that this partition frame be eliminated in view of the easier assembly and lower production cost this would afford. In order to eliminate the partition frame, the windup pinion 5a and the drive pinion 9a must be supported by the right and left frames 11a and 12a. However, this inherently causes these two gears to collide with one another, and consequently the elimination of the partition frame has been impossible. For enabling emission of the partition frame, Japanese Utility Model Publication 1-28305 (corresponding to U.S. Pat. No. 4,623,039) provides a spring drive wherein, as shown in FIG. 7, a drive pinion 9b is supported by right and left frames 11b and 12b, a stepped portion 10b having a larger diameter than a gear 6 is formed between the gear 6b of a spring windup shaft and a large gear 8b, and one end of a windup pinion 5b is supported by the stepped portion 10b and a spur gear 20b, thereby eliminating the partition frame.

According to this conventional spring drive, the intermediate partition frame is effectively eliminated. However, as mentioned above, since the windup pinion 5b is supported by both the stepped portion 10b and the spur gear 20b, if the gears and other components are manufactured with very litter clearance, the friction will increase between the windup pinion, and the stepped portion and the spur gear and thus considerably decrease the rotation torque derived from the spring. Moreover, in this Japanese Utility Model Publication, although a projection or a recess is provided on each of the supporting surfaces for the windup pinion of the stepped portion 10b and the spur gear 20b and one end of the windup pinion 5b, there are nevertheless four contact points or surfaces so that little or no decrease in friction is realized.

SUMMARY OF THE INVENTION

It is an object of the present invention to provide a spring drive having a support for the windup pinion which considerably decreases the supporting friction of the windup pinion.

The spring drive according to the present invention comprises a windup pinion, a spring windup shaft having a gear meshed with the windup pinion, a large gear provided around the spring windup shaft, a drive pinion with the large gear, and spur gear integrally formed with the drive pinion, wherein at least the top of one end of the windup pinion is formed at its rotation axis as a small diameter end having a diameter smaller than the diameter of the body thereof, and a supporting member having a supporting surface for supporting the windup pinion at the small diameter end, is directly or indirectly provided on the spring windup shaft or drive axis.

It is preferable for the supporting surface to be at least an annular surface facing the small diameter end of the windup pinion. It is also preferable for the supporting member to be formed as a stepped portion provided between the gear of the windup pinion and the large gear, or for the spur gear to serve also as the supporting member.

These and other objects, features, and advantages of the present invention will be apparent upon reading of the following description of the invention when taken in connection with the attached drawings on the understanding that some modifications, changes and variations can be easily made by those skilled in the art to which the invention pertains without departing from the spirit of the invention or the scope of the appended claims.

DETAILED DESCRIPTION OF THE PREFERRED EMBODIMENT OF THE INVENTION

Figure 1:
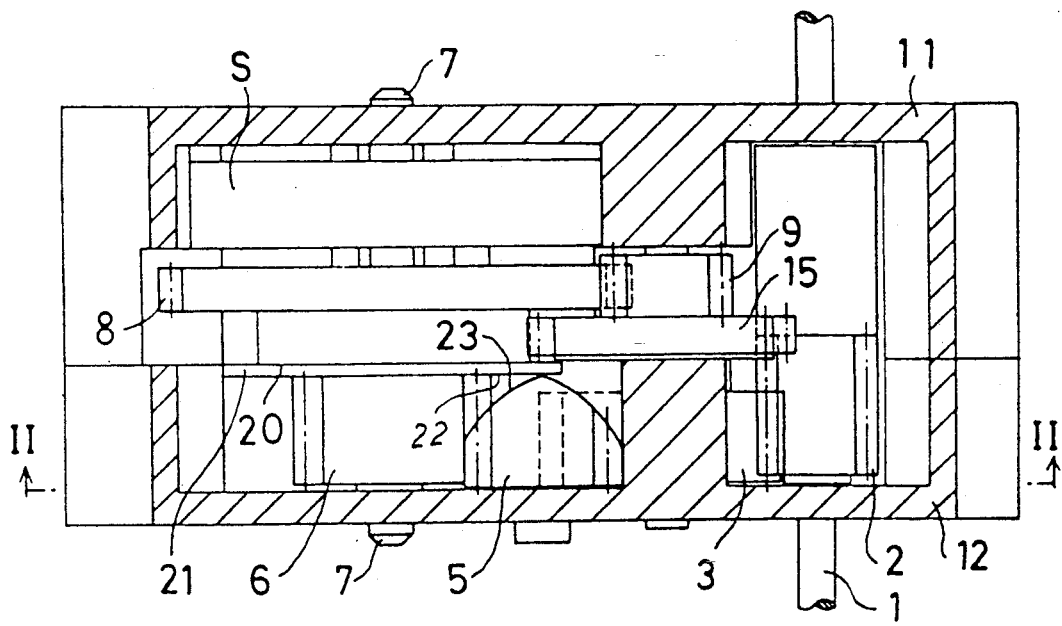
FIG. 1 is a horizontal sectional view of an embodiment of the present invention.
Figure 2:
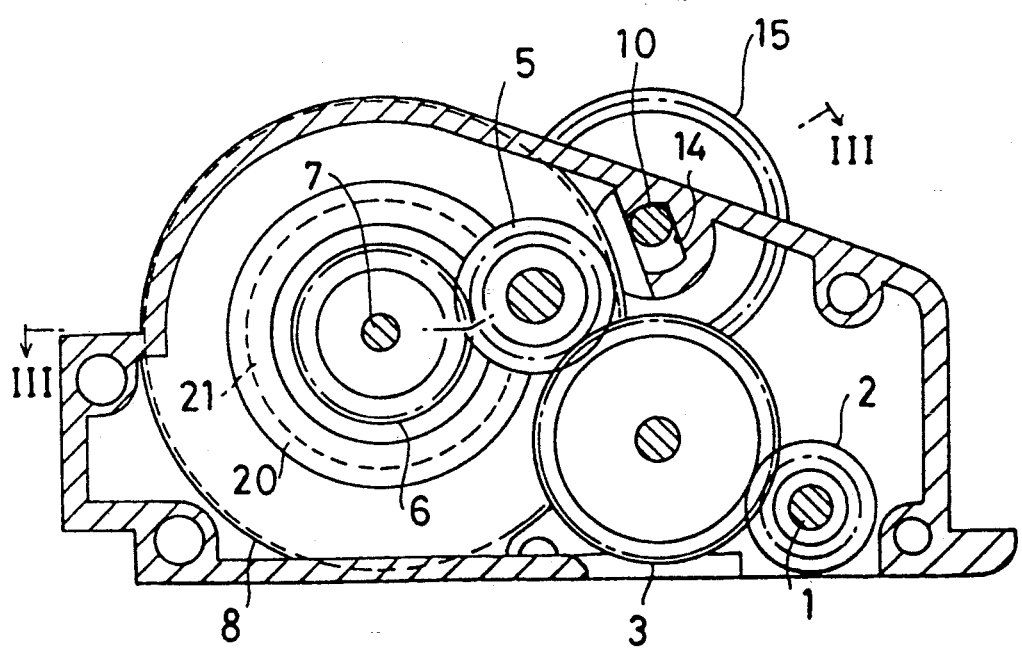
FIG. 2 is a sectional view taken along a line II—II of FIG. 1.
Figure 3:
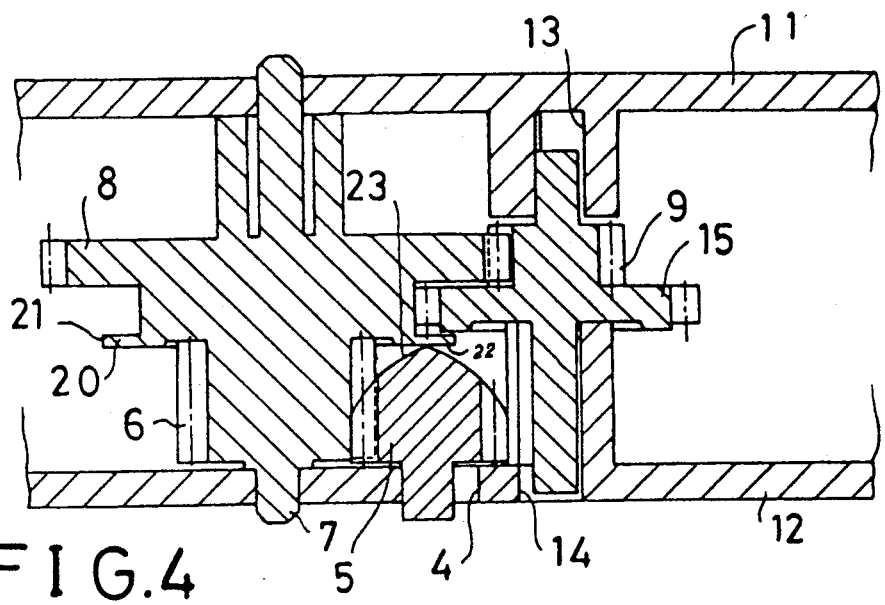
FIG. 3 is a sectional view taken along a line III—III of FIG. 2.

Referring FIGS. 1 to 3, the spring drive according to the first embodiment of the present invention comprises a pinion 2 provided around a wheel shaft 1, a spur gear 3 meshed with the pinion 2, a windup pinion 5 always meshed with the spur gear 3 and movably supported by a slit-shaped hole bearing 4, a spring windup shaft 7 with spring 5 having a gear 6 meshed with the pinion 5, a large gear 8 provided around the spring windup shaft 7, a drive pinion 9 always meshed with the large gear 8 and provided on a drive shaft 10 movably supported by a slit-shaped hole bearing 13, 14 formed in frames 11, 12, respectively. A pinion 16 is provided integrally with the spur gear 3, and always meshes with the pinion 2. A spur gear 15 is provided integrally with the drive pinion 9, and a stepped portion 20 having a larger diameter than that of the gear 6 is formed between the gear 6 of the spring windup shaft and the large gear 8.

At least the top of one end 23 of the windup pinion 5 is formed at its rotation axis as a small diameter end having a diameter smaller than the diameter of the body thereof. Specifically, the one end 23 of the windup pinion 5 is tapered, that is, the windup pinion 5 is formed in a mushroom or top-like shape as a whole, as shown in FIGS. 1, 2, and 3. On the stepped portion 20, there is provided an annular flange 21 which extends over the top of the one end 23 of the windup pinion 5. One surface 22 of the annular flange 21 faces the small diameter end 21 of the windup pinion 5. The windup pinion 5 is freely rotationally supported on the one surface 22 of the annular flange 21 at its small diameter end 23. Namely, the stepped portion 20 including the annular flange 21 serves as a supporting member for the windup pinion 5, and the one surface 22 serves as a supporting surface for the windup pinion 5.

According to the present spring drive, as mentioned above, since the windup pinion 5 is freely rotatively supported at its small diameter end 23 on the supporting surface 22 of the frage 21 of the stepped portion 20, the friction force acting against the rotation of the pinion 5, is decreased so that a greater driving torque is derived from the unwinding of a spring (not shown).

Because the windup pinion 5 and the supporting surface 22 of the flange 21 rotate in the same direction, the windup pinion 5 and the supporting surface 22 accelerate the rotation thereof each other to increase the rotation torque.

The supporting member may be provided on the gear 6 integrally, or may extend directly from the spring windup shaft 7.

The function of the thus constructed spring drive according to the present invention will now be explained.

As the wheel shaft 1 is driven in a direction opposite to the running direction of the toy, the gear 6 around the spring windup shaft is turned by way of the spur gear 3 and the windup pinion 5 to wind up the spring. In this state, the windup pinion 5 is freely rotationally supported at the top of the small diameter end 23 by the supporting surface 22 of the flange, and the rotation of the spur gear 3 is transmitted to the gear 6 of the spring windup shaft 7 without any trouble. In the winding-up of the spring, the large gear 8 is also rotated in the rotational direction in which it is free with respect to the drive pinion. When the winding-up of the spring is finished, the large gear is rotated by the unwinding force of the spring, while the windup pinion becomes freed by this rotation of the large gear. Thereby, in the same manner as in the conventional device of this type, the wheel shaft 1 is rotated by way of the spur gear 15 integrally formed with the drive pinion 9 and the pinion 16 integrally formed with the spur gear 3.

Figure 4:
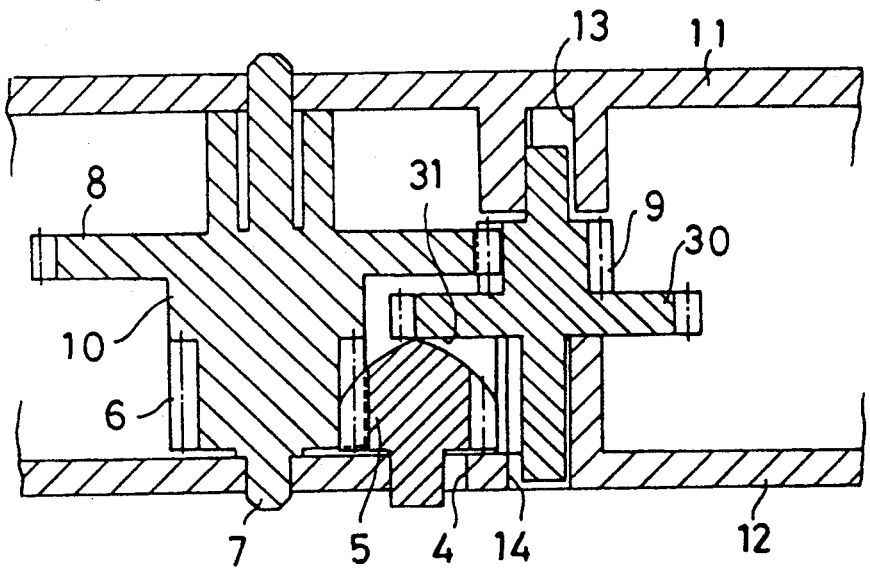
FIG. 4 is a horizontal sectional view of another embodiment of the present invention.

The spring drive according to the second embodiment of the present invention will now be explained with reference to FIG. 4.

In this embodiment, the spur gear 30 serves as the supporting member for the windup pinion 5, and the one surface 31 corresponding to the spur gear 15 of the first embodiment serves as the supporting surface 22 for the windup pinion 5. In this case, the spur gear 30 is larger than the spur gear 15 and extends over the top of the one end 23 of the pinion 5.

The embodiment does not have the stepped portion 20 of the first embodiment.

Figure 5:
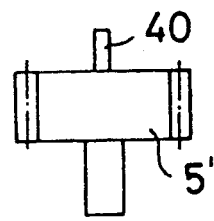
FIG. 5 is a top plan view of a modified windup pinion.
Figure 6:
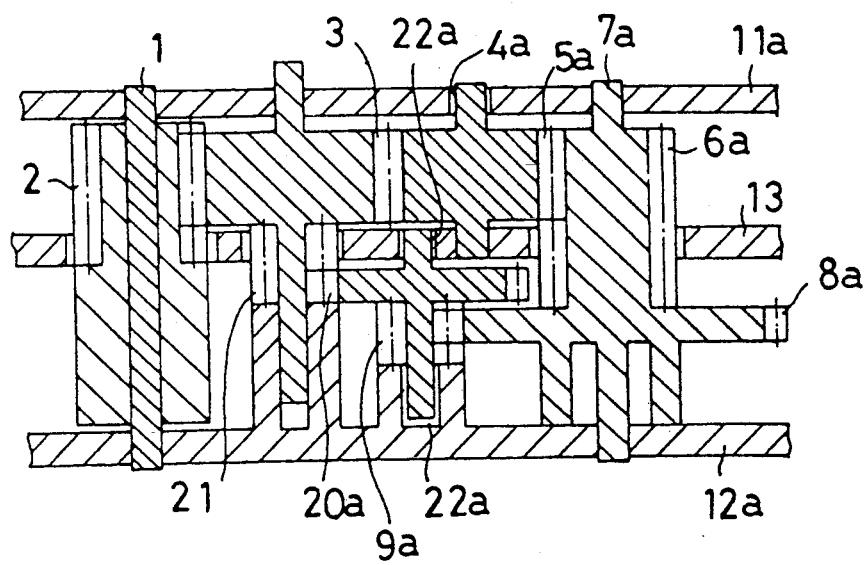
FIG. 6 is a horizontal sectional fragmental view of a conventional spring drive.
Figure 7:
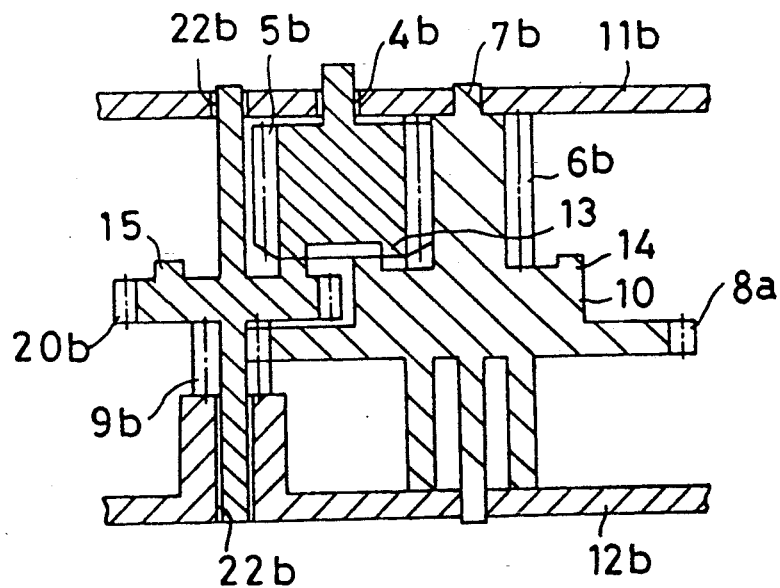
FIG. 7 is a horizontal sectional fragmental view of another conventional spring drive.

Furthermore, a windup gear 5' having a pin 40 as its small diameter end, as shown in FIG. 5, is used in place of the windup pinion 5.

What is claimed is:

1. A spring drive comprising a windup pinion, a spring windup shaft having a gear meshing with the windup pinion, a large gear provided around the spring windup shaft, a drive pinion meshed with the large gear, and a spur gear integrally formed with the drive pinion, wherein at least the top of one end of the windup pinion is formed at its rotation axis as a small diameter end having a diameter smaller than the diameter of the body thereof, and the windup pinion, at the small diameter end thereof, is supported by a supporting member having a supporting surface.

2. A spring drive according to claim 1, wherein the supporting surface is at least an annular surface facing the small diameter end of the windup pinion.

3. A spring drive according to claim 1 or 2, wherein the supporting member is formed as an stepped offset portion provided between the gear of the windup pinion and the large gear.

4. A spring drive according to claim 1 or 2, wherein the spur gear also serves as the supporting member.

5. A spring drive according to claim 1, wherein said supporting member having a supporting surface is provided on the gear of the spring windup shaft.

6. A spring drive according to claim 1, wherein said supporting member having a supporting surface extends directly from the spring windup shaft.

* * * * *